United States Patent
Peters et al.

(10) Patent No.: US 11,048,681 B2
(45) Date of Patent: Jun. 29, 2021

(54) APPLICATION SUGGESTION FEATURES

(71) Applicant: Apple Inc., Cupertino, CA (US)

(72) Inventors: Stephen C. Peters, Cupertino, CA (US); Kit-Man Wan, Cupertino, CA (US); Gaurav Kapoor, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 15/374,946

(22) Filed: Dec. 9, 2016

(65) Prior Publication Data

US 2017/0249344 A1    Aug. 31, 2017

Related U.S. Application Data

(63) Continuation of application No. 14/501,000, filed on Sep. 29, 2014, now Pat. No. 9,547,683.

(Continued)

(51) Int. Cl.
*G06F 3/048* (2013.01)
*G06F 16/23* (2019.01)
(Continued)

(52) U.S. Cl.
CPC ............ *G06F 16/23* (2019.01); *G06F 3/0482* (2013.01); *G06F 3/04817* (2013.01);
(Continued)

(58) Field of Classification Search
None
See application file for complete search history.

(56) References Cited

U.S. PATENT DOCUMENTS

| 6,121,968 A | 9/2000 | Arcuri et al. |
| 7,697,557 B2 | 4/2010 | Segel |

(Continued)

FOREIGN PATENT DOCUMENTS

| CN | 101911636 A | 12/2010 |
| JP | 2006350735 A | 12/2006 |
| KR | 1020120107978 A | 10/2012 |

OTHER PUBLICATIONS

PCT Application No. PCT/US2015/027220—International Search Report and Written Opinion dated Aug. 4, 2015.
(Continued)

*Primary Examiner* — Thanh T Vu
(74) *Attorney, Agent, or Firm* — Dickinson Wright RLLP

(57) ABSTRACT

This application relates to features for a mobile device that allow the mobile device to assign utility values to applications and thereafter suggest applications for a user to execute. The suggested application can be derived from a list of applications that have been assigned a utility by software in the mobile device. The utility assignment of the individual applications from the list of applications can be performed based on the occurrence of an event, an environmental change, or a period of frequent application usage. A feedback mechanism is provided in some embodiments for more accurately assigning a utility to particular applications. The feedback mechanism can track what a user does during a period of suggestion for certain applications and thereafter modify the utility of applications based on what applications a user selects during the period of suggestion.

20 Claims, 12 Drawing Sheets

Related U.S. Application Data

(60) Provisional application No. 62/005,812, filed on May 30, 2014.

(51) Int. Cl.
    *G06F 3/0482*     (2013.01)
    *G06F 3/0488*     (2013.01)
    *G06F 3/0481*     (2013.01)
    *G06F 3/0484*     (2013.01)

(52) U.S. Cl.
    CPC ...... *G06F 3/04842* (2013.01); *G06F 3/04847* (2013.01); *G06F 3/04883* (2013.01)

(56) References Cited

U.S. PATENT DOCUMENTS

| | | |
|---|---|---|
| 2011/0137881 A1 | 6/2011 | Cheng et al. |
| 2012/0015693 A1* | 1/2012 | Choi ..................... G06F 3/0484 455/566 |
| 2013/0035138 A1* | 2/2013 | Abbott ................... H04L 67/36 455/566 |
| 2013/0132896 A1* | 5/2013 | Lee ....................... G06F 16/907 715/808 |
| 2013/0173637 A1 | 7/2013 | Kim et al. |
| 2013/0198506 A1 | 8/2013 | Smith et al. |
| 2014/0108978 A1* | 4/2014 | Yu ......................... G06F 3/0482 715/765 |
| 2015/0113457 A1* | 4/2015 | Li .......................... G06F 9/451 715/765 |
| 2015/0347488 A1 | 12/2015 | Peters et al. |

OTHER PUBLICATIONS

Korean Patent Application No. 10-2018-7035858—Notice of Preliminary Rejection dated Jan. 21, 2019.
Korean Patent Application No. 10-2018-7035858—Notice of Final Rejection dated Jul. 29, 2019.
Chinese Patent Application No. 201580028724.X—First Office Action dated Mar. 20, 2019.
Chinese Patent Application No. 201580028724.X—Second Office Action dated Sep. 9, 2019.

* cited by examiner

APPLICATION SUGGESTION FEATURES

CROSS-REFERENCE TO RELATED APPLICATIONS

This application is a continuation of U.S. application Ser. No. 14/501,000, filed Sep. 29, 2014, of the same title, which claims the benefit of U.S. Provisional Application No. 62/005,812 filed May 30, 2014 of the same title, the contents of which are incorporated herein by reference in their entirety for all purposes.

FIELD

The described embodiments relate generally to software application suggestion features. More particularly, the present embodiments relate to ranking and suggesting applications based on a variety of learning algorithms.

BACKGROUND

Mobile computing devices have provided users with a variety of applications related to social networking, email, task management, and entertainment, among others. Given the vast number of applications available for a user to download, the user could potentially fill a device with an almost limitless number of applications depending on the storage capacity of the device. However, beyond the inclination of the user to download and install applications, the device does not assist the user in managing the applications stored on the device. Over time, if a user is not actively uninstalling or otherwise arranging any unused applications on the device, the user may be left digging through a plethora of applications to find an application he or she wants to open at a given time, leading to disorganization.

A lack of organization can frustrate the user despite the fact that many of the applications are directed toward facilitating a friendlier user experience. Additionally, any assistance provided by the device for influencing the choices a user makes when choosing applications can typically be limited, especially because device developers often want to avoid usurping the decision making power of the user. This impasse is exacerbated as a user personally changes over the period of ownership of a device and the presentation of applications fails to change with the user. For example, in devices that include a desktop or home screen, a user typically must manually modify the home screen in order to coincide with the any changing frequency of use for certain applications. Additionally, despite many devices being a firsthand witness to the user's habits and activities, the devices can often fail to learn and adapt to how the user is employing the device every day. For example, a user may switch jobs, have kids, or merely purchase a new device or software that can influence the daily life of the user. Additionally, developers often allow devices and applications to advertise new software for improving the user experience. However, what is promoted by an advertiser can typically relate to a product directed toward a group of users rather than one tailored for a specific user. In this respect, software and device developers may be backsliding by not collaborating with the user during the lifetime of the device or taking advantage of the opportunity to adapt each device to the respective owner of the device.

SUMMARY

This paper describes various embodiments that relate to ranking and suggesting applications to a user based on a variety of learning algorithms. The embodiments described herein include a method for suggesting an application to a user of a mobile device. The method can include a step of receiving a list of applications that are stored on the mobile device. The method can further include a step of determining a utility for an application from the list of applications. Additionally, the method can include a step of causing a highest utility application from the list of applications to be represented on a user interface of the mobile device.

In some embodiments, a non-transitory computer readable storage medium is set forth. The non-transitory computer readable storage medium can store instructions that, when executed by a processor included in a computing device, cause the computing device to receive a command to generate a list of applications. The instructions can further include a step of generating a list of applications based on a circumstance of the command. Additionally, the instructions can include a step of sending the list of applications to a predictive engine to assign a utility value to each application in the list of applications, and causing an ordered list of applications to be generated.

In other embodiments, a system configured to assign utility values to applications is set forth. The system can include a processor, a graphical user interface (GUI), and a memory. The memory can be configured to store instructions that, when executed by the processor, cause the system to generate a list of applications to be assigned a utility. The instructions can also cause the system to assign a utility for each application in the list of applications based on a circumstance of or associated with the system. Additionally, the instructions can further cause the system to display, at the GUI, an icon associated with a highest utility application from the list of applications.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
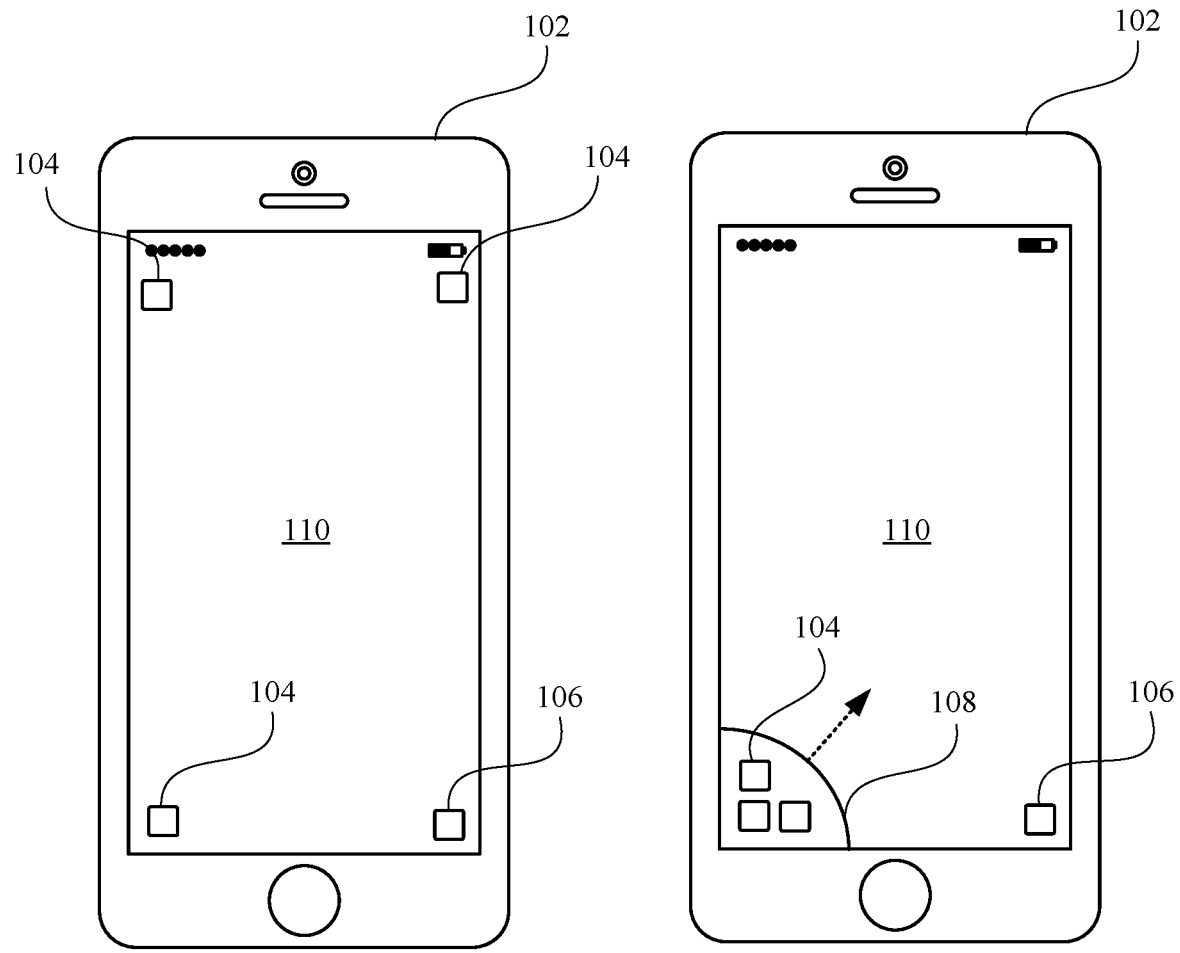
FIGS. 1A-1B illustrate a front view of a mobile device displaying one or more suggested application icons.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein set forth a feature for a mobile device that allows the mobile device to assign utility values to applications and suggest applications for a user to execute over the life of the mobile device. The suggested applications can appear in a portion of the display of a mobile device in a way that makes the suggested application noticeable to the user at certain points in time. For example, an icon for the suggested application can be configured to appear on the display of the mobile device only when the mobile device is locked, starting up, or displaying an idle screen. The suggested application can be derived from a list of applications that have been assigned a utility by software in the mobile device. The list of applications can originally be a factory-set list of applications, but over time as the user installs and uninstalls applications on the device, or otherwise use the applications, the list of applications can change. The applications can include any suitable application for use by a mobile device such as a reminder, calendar, internet, remote device, or social networking application, or any other suitable application.

The assigning of utilities to of the individual applications in the list of applications can be performed in a variety of ways. One way an application can be assigned a utility is by basing the utility (e.g., a positive real number) of the application on the occurrence of a particular event that is related to or requires the use of the application. When the event is approaching, the utility for the particular application can increase with time as the user becomes more interested in the application and as the event nears. During the event the application can receive the highest utility, and, thereafter, the utility can immediately drop or gradually drop to a lower utility over time. Another way the application can be assigned a utility is by basing the utility on an environmental change that relates to the application or requires the use of the application. Prior to the environmental change occurring, the utility for the application can be the lowest utility, but when the environmental change occurs the application can receive a higher utility. After the environmental change occurs, the utility for the application can gradually decrease over time because a user may not be interested in the application after the environmental change has occurred. Yet another way an application can be assigned a utility is by basing the utility on a period of frequent usage for the application being assigned a utility. Prior to the period of frequent usage, the utility of the application can zero, or another value indicating a lowest utility. However, when the period of frequent usage starts the utility for the application can be increased for the entire period of frequent usage. When the period of frequent usage ends, the utility for the application can immediately decrease or gradually decrease over time. The change over time for certain utility values can be based on probabilities related to a user's historical usage of a particular application. Additionally, an eligibility timer can be incorporated for preventing certain applications from returning to a prominent utility until the eligibility timer is reset or reaches a certain value.

A feedback mechanism is also provided in some embodiments for more accurately assigning utilities to particular applications. The feedback mechanism can track what a user does during a period that applications are being suggested to the user. For example, if a user chooses the second highest utility application instead of the first highest utility application at a particular time, a weight can be given to the second highest utility application to increase the utility of the second highest utility application. Additionally, a weight can be given to the former first highest utility application to decrease the utility of the former first highest utility application. In this way, the next time these applications are suggested to the user at a particular time, one application will carry more weight than the other and therefore be adapted to the user's previous selections, and any future selections. Other feedback and learning algorithms can be used to further optimize the list of applications in order to better suggest applications to a user at any given time.

These and other embodiments are discussed below with reference to FIGS. 1-12; however, those skilled in the art will readily appreciate that the detailed description set forth herein with respect to these figures is for explanatory purposes only and should not be construed as limiting.

FIGS. 1A-1B illustrate a front view of a mobile device 102 displaying one or more application icons 104. The application icons 104 can be arranged in any suitable configuration about a screen 110 of the mobile device 102 and be displayed contemporaneously with a permanent icon 106. In FIG. 1A the application icons 104 are arranged at the corners of the screen 110 and can change locations in the screen 110 according to some embodiments discussed herein. As shown in FIG. 1B, a hidden portion 108 can be toggled by a user to reveal the application icons 104. The hidden portion 108 can be populated with application icons 104 according to some embodiments described herein, and the application icons 104 can be presented on the screen 110 only after a user drags their finger across the screen 110 to toggle the hidden portion 108. The application icons 104 can originate in part from a launch service, predictive engine, and/or user interface service of the mobile device 102.

Figure 2:
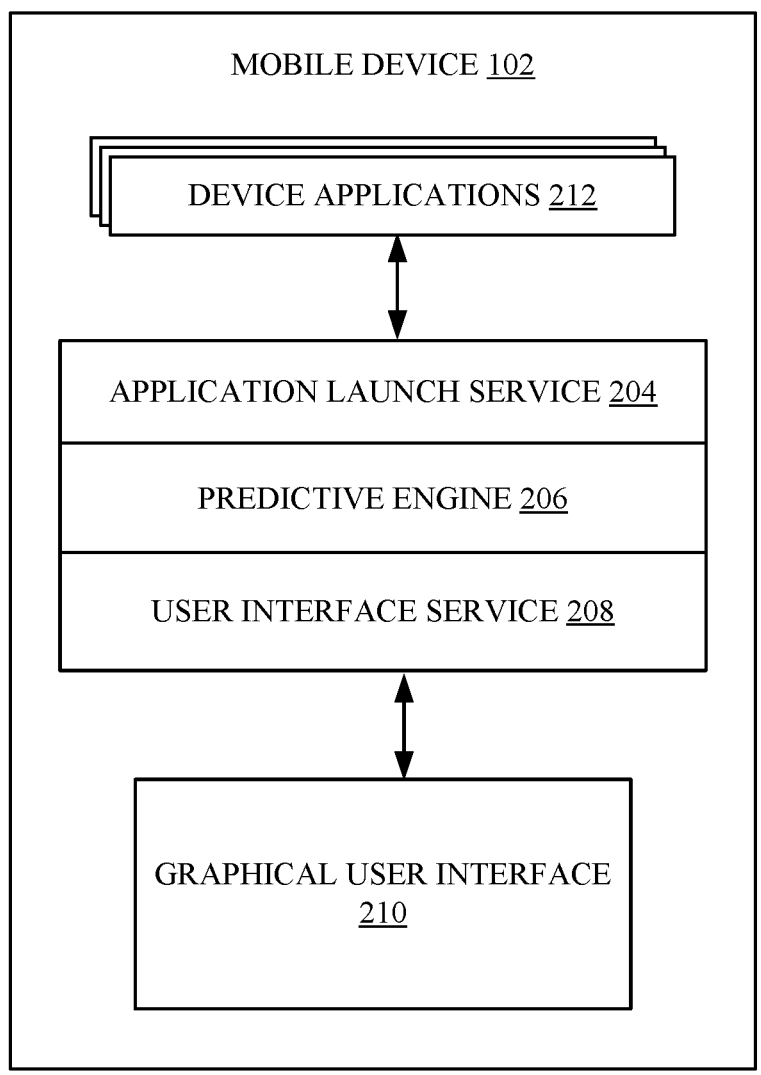
FIG. 2 illustrates the architecture of the mobile device according, to some embodiments described herein.

FIG. 2 illustrates the architecture of the mobile device 102. Specifically, mobile device 102 includes an application launch service 204 that is configured to inventory device applications 212 stored on the mobile device 102 at any given time. The application launch service 204 is configured to retrieve a list of applications or application identifiers associated with each device application 212 on the mobile device 102 and compile all the identifiers into a list that can be distributed by the application launch service 204. The application launch service 204 can initiate retrieval of the list of applications based on a circumstance detected by any suitable mechanism of the mobile device 102. Examples of such mechanisms can include clocks, proximity sensors, global positioning systems, communication devices, applications, image devices, audio devices, and the like. A predictive engine 206 can be provided with the list of applications compiled by the application launch service 204. The predictive engine 206 can further organize the list of identifiers according to analytical data related to usage of the mobile device 102 and the device applications 212. The analytical data can include any suitable data related to the device applications 212 and/or the mobile device 102. For example, the analytical data can include time and length of usage of a device application 212, time and length of usage of the mobile device 102, functions performed before, after, or during usage of the device applications and/or mobile device 102, changes in the aforementioned analytical data over time, of any suitable data related to applications usage. As further discussed herein, the predictive engine 206 uses the analytical data to assign utility values to the device applications and reorganize the list of applications thereafter. Upon compiling a list of applications assigned a utility according to the analytical data, the predictive engine 206 can rank or order the applications according to utility, and send or otherwise make the ranked list of applications available to other services or device applications 212 on the mobile device 102.

A user interface service 208 is provided in FIG. 2 for managing the presentation of device applications 212 on a graphical user interface 210. Specifically, the user interface service can receive the ranked list of applications from the predictive engine 206 and determine how the applications will be displayed at the graphical user interface 210. The user interface service 208 can be configured to store or access a variety of icons or graphics related to the applications stored on the mobile device 102. The graphics can be static or dynamic depending on the respective embodiment. In some embodiments, an application identifier can specifically identify multiple device applications 212 allowing the graphic associated with the device applications 212 to contain a variety of texts or pictures that relate to the multiple device applications 212. In other embodiments, an application identifier can identify a single device application 212 and contain a variety of texts or pictures, or only a single picture or characters, which relate to the single device application 212. For example, where only one application icon 104 is displayed, the application icon 104 can refer to the highest utility device application 212, or refer to more than one device application 212 on the list of application identifiers.

Figure 3:
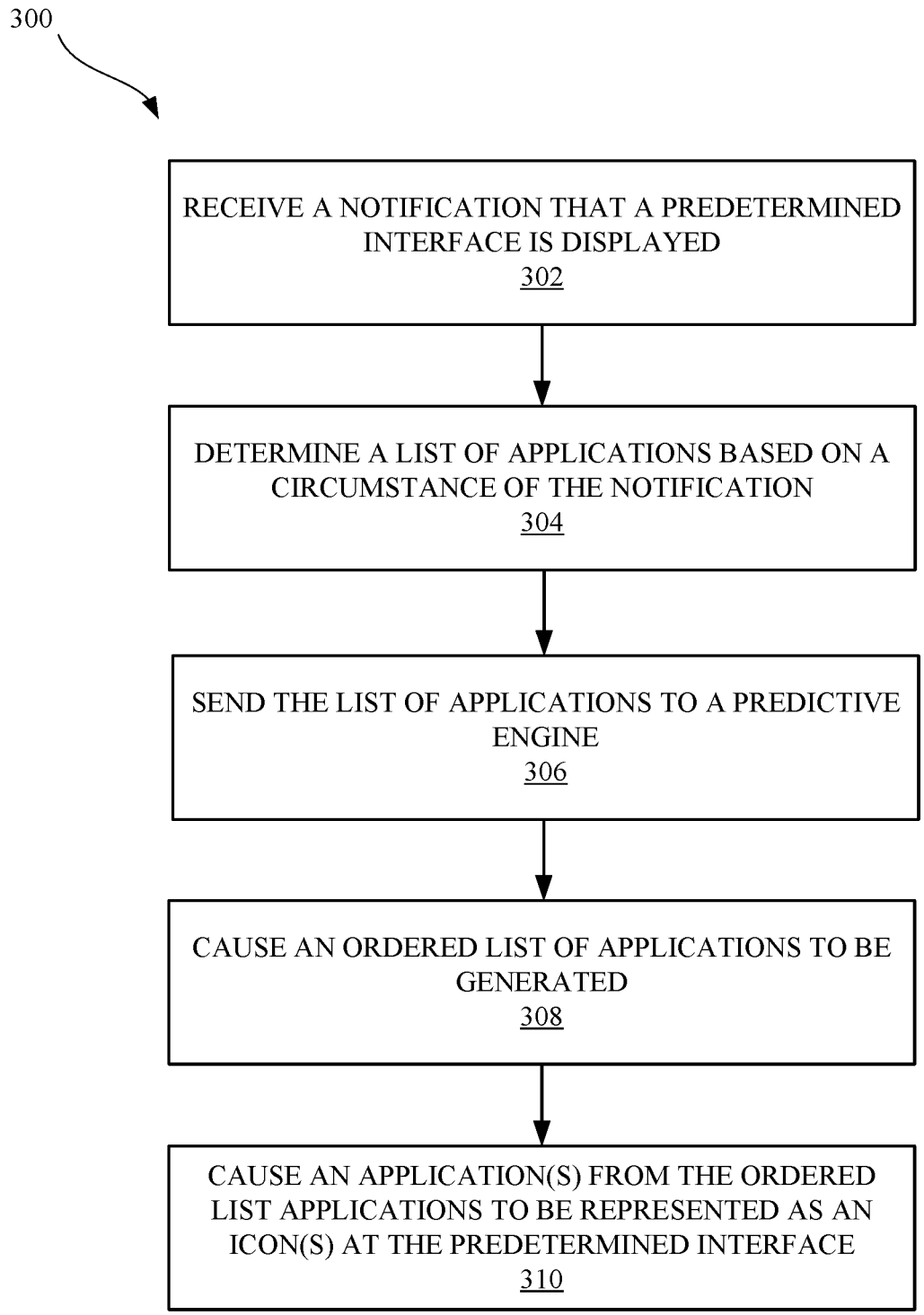
FIG. 3 illustrates a method for operating the application launch service, according to some embodiments described herein.

FIG. 3 illustrates a method 300 for operating the application launch service 204 according to some embodiments described herein. Specifically, the method 300 includes a step 302 of receiving, by the application launch service 204, a notification that a predetermined interface is being displayed. The predetermined interface is a display that is designated for initiating operations of the application launch service 204. The predetermined interface can be a desktop, lock screen, home screen, application screen, or any suitably arranged screen for displaying an application icon 104 according to the embodiments described herein. Additionally, step 302 can be based on an operation initiated by the user of the mobile device 102 or one derived from a function of the mobile device 102. The method 300 can further include a step 304 of determining, by the application launch service 204, a list of applications based on a circumstance of the notification. The list of applications, as discussed herein, can refer to any number of applications available to the mobile device 102. The circumstances from which the list of applications can be based are not limited to those created by the user or the mobile device 102. In some embodiments, the movement of a user, or an audio or visual stimuli created by the user can be the circumstance from which the list of applications can be based. For example, the user can speak a command or aim a camera of the mobile device 102 in order to create the stimuli from which the list of applications can be based. In other embodiments, the mobile device 102 creates the circumstance from which the list of applications is based through a software or hardware mechanism of the mobile device 102. For example, the mobile device 102 can receive automatic updates through a wireless communication device within the mobile device 102, which can be the basis for the creation of the list of applications.

The circumstance that forms the basis for the list of applications in some embodiments will determine if all or some of the applications on the mobile device 102 will be included on the list of applications. In some embodiments, a filter can be applied to the list of applications in order to provide a user with the most relevant applications at the occurrence of the circumstance. Types of circumstances can be those related to geography, time, schedule, usage, external devices, weather, outgoing or incoming signals, or any suitable happening or occurrence that can be related to a software application. For example, when a user brings the mobile device 102 into an area having Wi-Fi, the mobile device 102 can categorize this happening as a circumstance on which to base the determination of a list of applications.

The method 300 can further include a step 306 of sending, by the application launch service 204, the list of applications to a predictive engine 206. As discussed further herein, the predictive engine 206 can use analytical data related to usage of the mobile device 102 in order to predict certain actions of a user. These actions can include when the user opens and closes an application, or otherwise executes a function of the mobile device 102. The predictive engine 206 can begin storing the analytical data from the first time the user turns on the mobile device 102. In some embodiments, the analytical data is stored on the mobile device 102, or stored on an external device (e.g., cloud storage). In other embodiments, the analytical data is temporarily stored for a predetermined period of time and replaced as new analytical data is created by the predictive engine 206.

At step 308, the application launch service 204 can cause an ordered list of applications to be generated by the predictive engine 206. The predictive engine 206 manages the priorities for the applications or application identifiers of the list of applications by assigning utilities (also referred to as utility values herein) to each application. Each application receives a utility or a weight as a result of the list of applications being sent to the predictive engine 206. The utilities are based on the analytical data and the circumstance of the notification from step 304, which is in part because the circumstance is the basis for the creation of the original list of applications sent to the predictive engine 206. The analytical data provides a basis for the utilities for each application by enabling the predictive engine 206 to forecast which applications the user may be most interested in executing. In some embodiments, the utility is a value between 0 and 1, where 1 indicates the best application to propose to the user at a given time and 0 represents the worst application to propose. These utilities can be scaled to any suitable value, metric, or characters that a user can interpret to indicate favorability. When provided with the list of applications, the predictive engine 206 can take the total number of applications from the list of applications and incorporate the total into the calculation for the utilities of each application. For example, if the list of applications includes a total of 5 applications, then the total number of utilities will be 5. Because the utilities are from 0 and 1 in some embodiments, at least one of the utilities can be 0, and the rest will be multiples of ¼. In this way, when the list of applications includes 5 total applications, the order of utilities from highest utility to lowest utility can be 1, ¾, ²⁄₄, ¼, and 0. Additionally, in some embodiments, the utilities can be from 1 to the total number of applications in the list of applications (e.g., 5). The utilities can also be any other suitable set of numbers or characters for indicating a score or utility.

In certain instances, one application from the list of applications can be assigned a utility the highest because the application is most associated with the circumstance that resulted in the generation of the list of applications. If a user opens up a particular application at least a majority of the time when a certain circumstance comes about, that particular application can be assigned a highest utility among any other applications included in the list of applications. If the user tends to open up more than one application at the time of a certain circumstance, the predictive engine 206 can consider other factors when determining the utility for a particular application. Other factors can include information stored on the mobile device 102, or data that is external to the mobile device 102 but in some way relates to a circumstance and is discoverable by the mobile device 102. For example, a user of the mobile device 102 may have a habit of opening a news application and a cloud storage application prior to the usual time the user arrives at work (e.g., 8:00 AM). Additionally, the user may not typically open the news application if a calendar application on the mobile device 102 indicates that a meeting is scheduled at the time the user usually arrives at work. In this scenario, the predictive engine 206 can assign a utility value to the cloud storage application higher than the news application based on both the user's work schedule and a calendar application on the mobile device 102. For clarification, in another example, the user may typically call a contact from their address book every Saturday evening and subsequently check both a restaurant application and a banking application. However, when the user does not call a contact from the address book on Saturday evenings, the user opens a reading application. In this scenario, the predictive engine 206 can receive a list of the aforementioned applications and determine a utility for the address book, restaurant application, banking application, and reading application on or before any Saturday evening. The predictive engine 206 can assign a utility value to the address book or the reading application highest depending on the analytical data for indicating the most frequently used application on Saturday evenings. Thereafter, if the address book is displayed and the user chooses the address book, the predictive engine 206 can assign a utility value to the restaurant application and/or the banking application based on similar analytical data.

The method 300 can include a step 310 of causing, by the application launch service 204, a first application from the ordered list of applications to be represented as an icon at the predetermined interface. As discussed herein, one or more application icons 104 can be displayed on a predetermined screen. These application icons 104 represent applications determined to be of interest to a user at a particular time based on the utilities discussed herein. The application icons 104 can be directed to one or more applications having the highest utilities out of all the applications on the ordered list of applications. By providing these application icons 104 to the user at certain times, the user will be able to quickly navigate to the application that most interests them at a particular time without having to search through other applications or screens.

Figure 4:
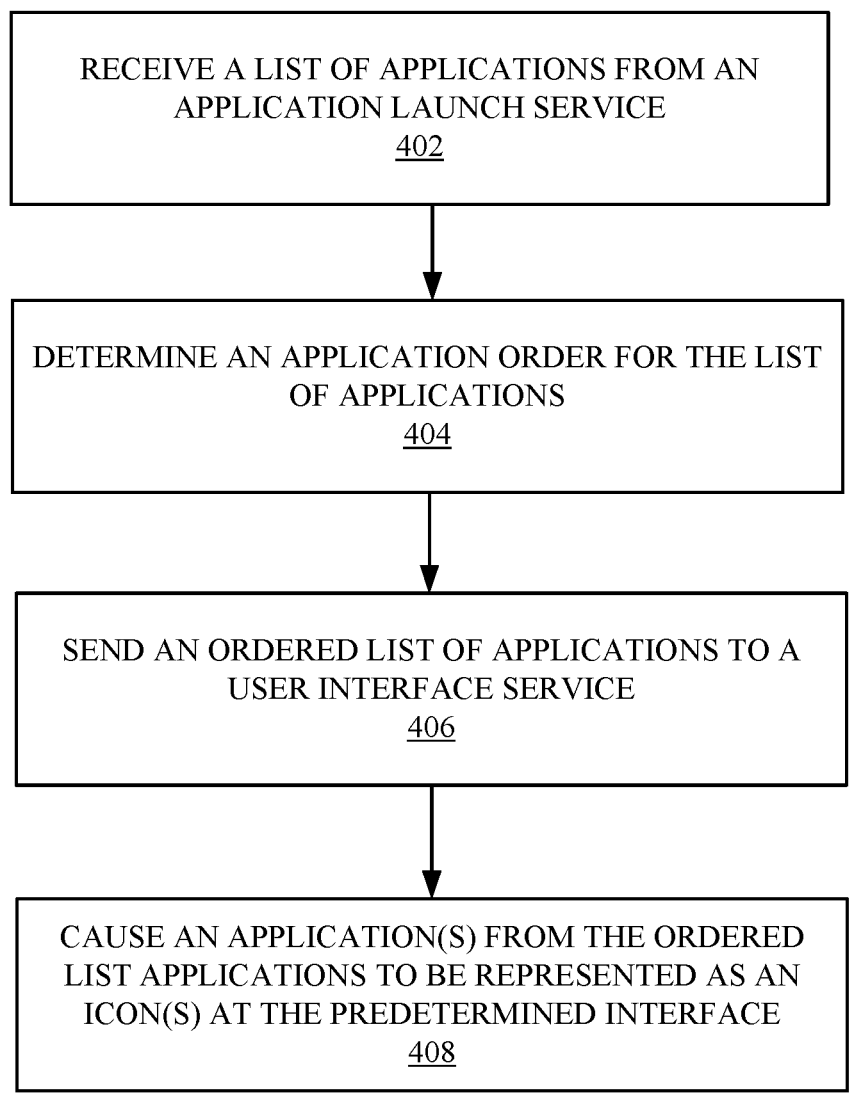
FIG. 4 illustrates a method for operating the predictive engine, according to some embodiments described herein.

FIG. 4 illustrates a method 400 for operating the predictive engine 206 according to some embodiments described herein. The method 400 can be modified and arranged according to any of the embodiments described herein. At step 402, the predictive engine 206 receives a list of applications from the application launch service 204. The order of the applications in the list of applications is determined at step 404. At step 406, once the ordering of the list of applications is completed, the predictive engine 206 sends the ordered list of applications to the user interface service 208. In some embodiments, only one or more of the highest utility applications in the ordered list of applications is sent to the user interface service 208. Thereafter, at step 408, at least one application is caused to be represented as an icon at the predetermined interface by the predictive engine 206.

Figure 5:
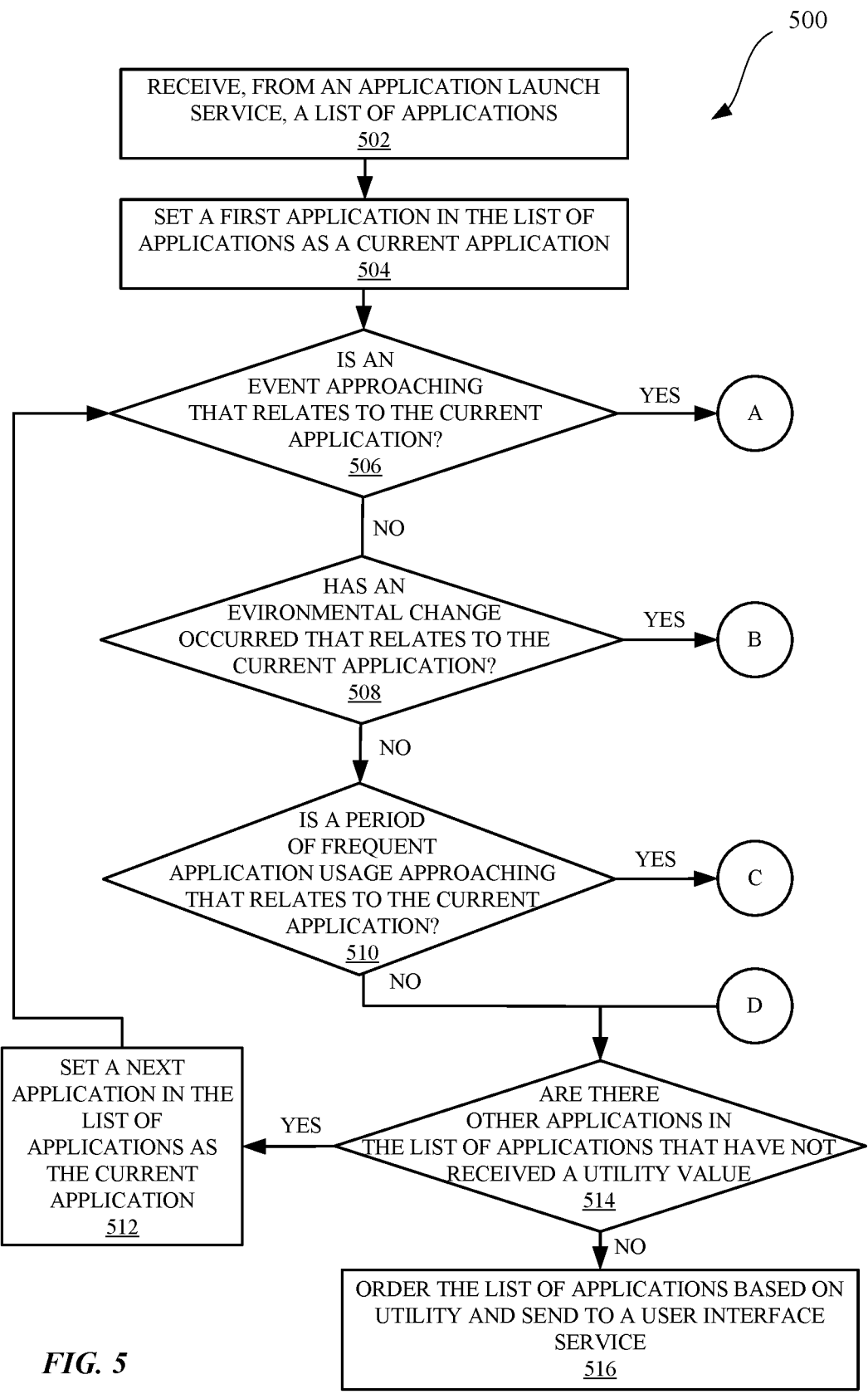
FIG. 5 illustrates a method for determining a utility of one or more applications in a list of applications using a predictive engine, according to some embodiments described herein.

FIG. 5 illustrates a method 500 for assigning a utility to one or more applications in a list of applications using the predictive engine 206 according to some embodiments described herein. Specifically, FIG. 5 sets forth a variety of ways an application is assigned a utility according to certain circumstances that can be related to an application on mobile device 102. At step 502, the predictive engine 206 receives a list of applications from the application launch service 204. At step 504, the predictive engine 206 sets the first application in the list of applications as a current application. The current application refers to the application that will be, or is next to be, assigned a utility according to the embodiments described herein. At step 506, the predictive engine 206 determines whether an event is approaching that relates to the current application. If an event is approaching that relates to the current application, the method 500 is referred to node A where an event-based utility assignment is performed by the predictive engine 206, otherwise the method 500 proceeds to step 508. At step 508, the predictive engine 206 determines whether an environmental change has occurred that relates to the current application. If an environmental change has occurred that relates to the current application, the method 500 is referred to node B where an environmental-based utility assignment is performed, otherwise the method 500 proceeds to step 510. At step 510, the predictive engine 206 determines whether a period of frequent application usage is approaching that relates to the current application. If a period of frequent application usage is approaching that relates to the current application, the method 500 is referred to node C where a usage-based utility assignment is performed by the predictive engine 206, otherwise the method proceeds to step 514. Node D, which represents a continuation of the processes from nodes A, B, and C, as discussed further herein, also proceeds to step 514 after the utility assignment of the current application is performed. At step 514, the predictive engine 206 determines whether there are other applications in the list of applications that remain to go through the utility assignment process. If there are other applications that remain to be assigned a utility, the method 500 proceeds to step 512 where the predictive engine 206 sets the next application in the list of applications as the current application, and thereafter the method 500 reverts back to step 506. If there are no other applications from the list of applications that remain to be assigned a utility, the method 500 proceeds to step 516 where the predictive engine 206 orders the list of applications by utility, and sends the ordered list of applications to the user interface service 208.

Figure 6:
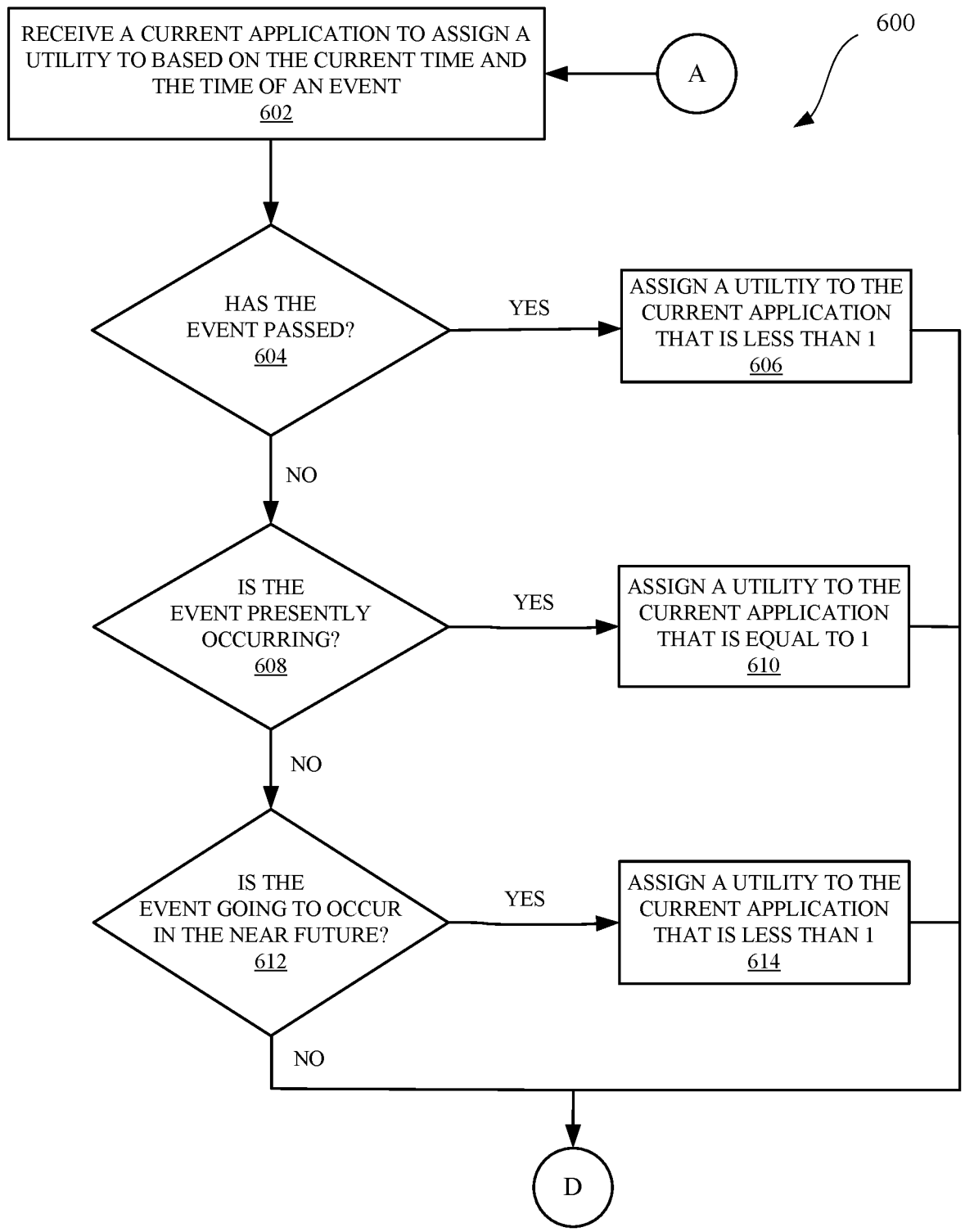
FIG. 6 illustrates a method for determining the utility of an application based on the occurrence of an event.

FIG. 6 illustrates a method 600 for performing an event-based utility assignment of a device application 212. The method 600 can be incorporated into the method 500 at node A when a determination is made to perform an event-based utility assignment of an application or application identifier. At step 602 of method 600, the predictive engine 206 receives a current application for assigning a utility based on the current time and the time of an event. The current application can be any application that is in some way associated with an event for the user or the mobile device 102. In some embodiments, the current application is a calendar application or any other suitable application that provides the details for an event. The event can be an event programmed into the mobile device 102 by the user of the mobile device 102 or an event automatically generated by the mobile device 102. For example, the user may program a meeting into a calendar application of the mobile device 102 and the event-based utility assignment method 600 will interpret the meeting as an event. Similarly, the event can be initiated by a web application on the mobile device 102 that automatically programs events into a user's mobile device 102 or maintains the events temporarily for a predetermined period of time. At step 604, the predictive engine 206 determines whether the event has passed. If the event has passed, the predictive engine 206 assigns a utility value to the current application with a utility value less than 1, according to step 606, otherwise the method 600 proceeds to step 608 where the predictive engine 206 determines whether the event is presently occurring. If the event is presently occurring, the currently application is assigned a utility value that is equal to 1, or other suitable value indicating a highest utility. If the event is not presently occurring, the method 600 proceeds to step 612 where the predictive engine 206 determines whether the event is going to happen in the near future. If the event is going to happen in the near future, the current application is assigned a utility value that is less than 1, according to step 614, otherwise the method 600 proceeds to node D. It should be noted that any utility values can be scaled or otherwise modified to any suitable value or character in order to similarly score the current application. Upon the current application being assigned a utility according to an event, the method 600 can refer to node D and thereafter return to method 500.

Figure 7:
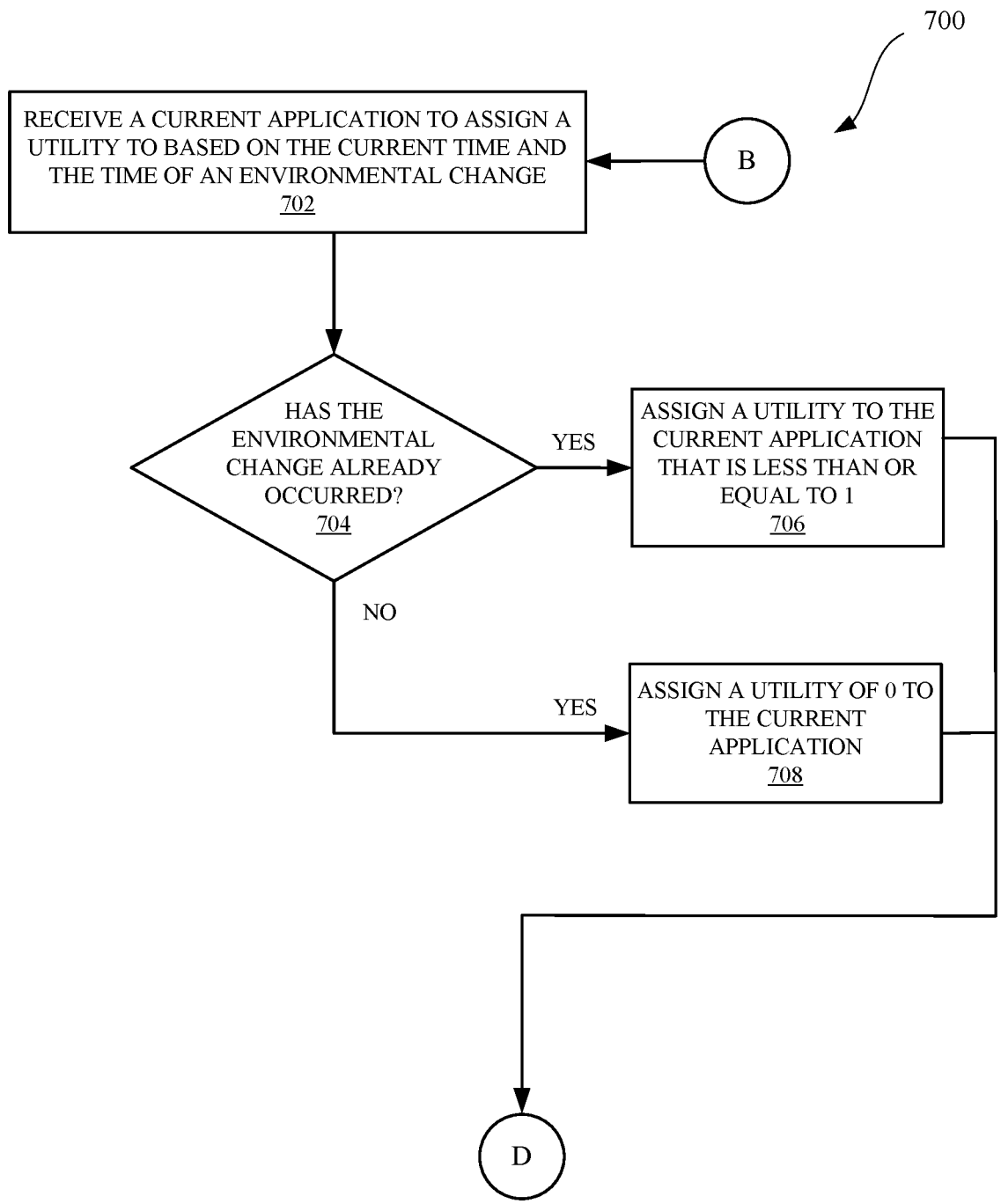
FIG. 7 illustrates a method of determining the utility of an application based on an environmental change.

FIG. 7 illustrates a method 700 of assigning a utility to an application based on an environmental change. Specifically, FIG. 7 sets forth a method 700 for assigning a utility to a current application based on both a current time and the time of an environmental change occurring at a mobile device 102. The method 700 can be incorporated into the method 500 at node B when a determination is made to perform an environmental-based utility assignment of an application or application identifier. At step 702, the predictive engine 206 receives a current application to assign a utility based on the current time and the time of an environmental change. An environmental change can include a change that the user initiated or a change that was outside of the user's control. For example, the user can initiate an environmental change by walking into a room that includes a device to which the mobile device 102 can communicate (e.g., a television). Similarly, an environmental change that can be outside the user's control can include the loss or detection of a network signal. At step 704, the predictive engine 206 determines whether the environmental change already occurred. If the environmental change already occurred, the current application is assigned a utility that is equal to or less than 1 the predictive engine 206, according to step 706. Otherwise, if the environmental change has not already occurred, the current application is assigned a utility of 0 by the predictive engine 206 according to step 708. Upon receiving a utility, the method 700 can refer to node D and thereafter return to method 500.

Figure 8:
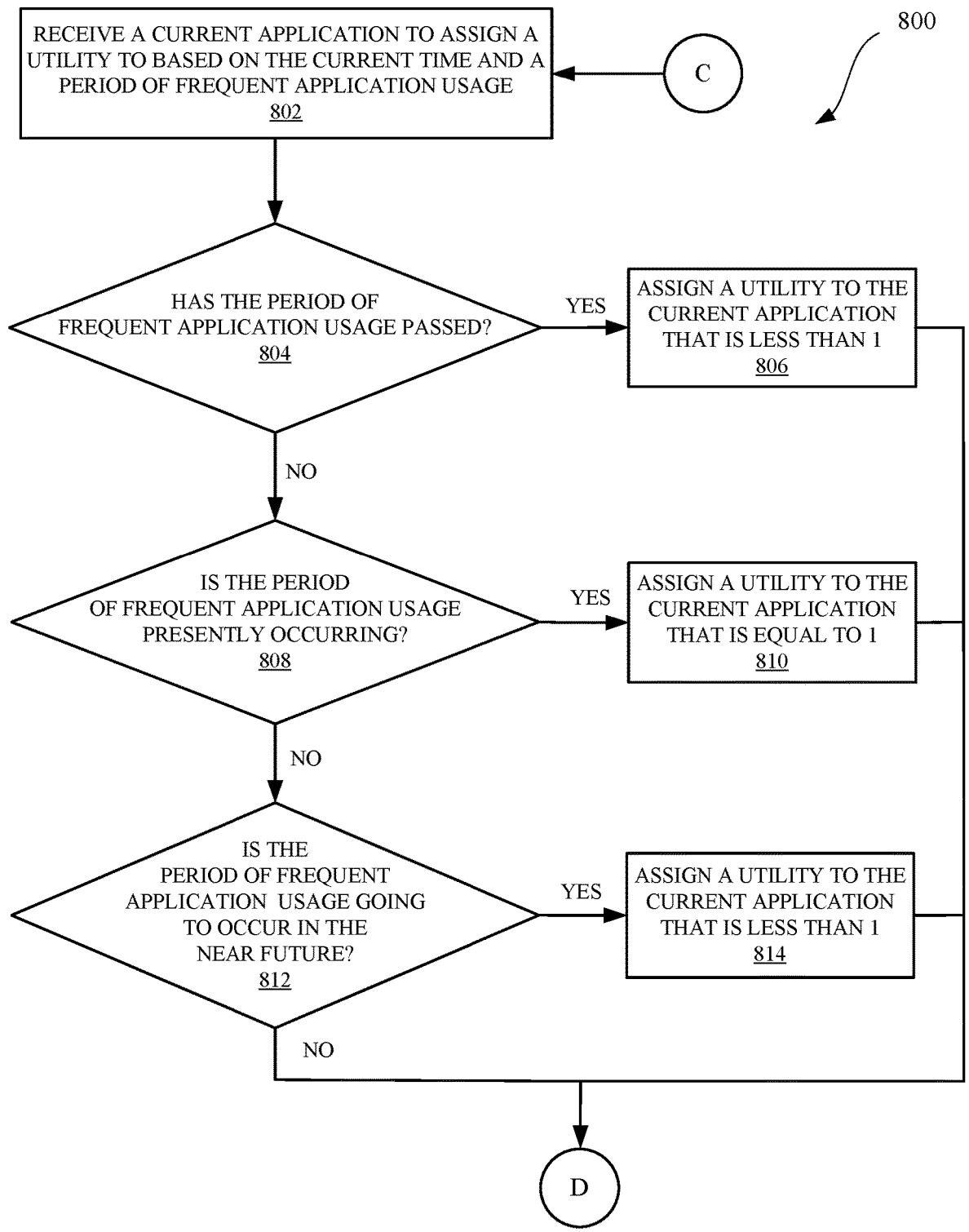
FIG. 8 illustrates a method for determining the utility of an application based on a period of frequent application usage.

FIG. 8 illustrates a method 800 for assigning a utility to an application based on a period of frequent application usage. Specifically, FIG. 8 sets forth the method 800 for assigning a utility to a current application based on the current time and a period of frequent application usage for the current application. The method 800 can be incorporated into the method 500 at node C when a determination is made to perform an application utility assignment based on a period of frequent application usage. At step 802, the predictive engine 206 receives a current application to assign a utility to based on the current time and a period of frequent application usage. A period of frequent application usage can relate to any suitable application that a user frequently opens during a certain period of time. For example, a user may frequently check a social networking application during a lunch hour, which would constitute a period of frequent application usage related to a device application. At step 804, the predictive engine 206 determines whether the period of frequent application usage has passed. If the period of frequent application usage has passed then the current application is assigned a utility of less than 1, or some other utility that is not the highest, according to step 806. Otherwise the method 800 proceeds to step 808 where the predictive engine 206 determines whether the period of frequent application usage is presently occurring. If the period frequent application usage is presently occurring, the method 800 refers to step 810 where a utility value equal to 1, or an otherwise highest utility, is assigned to the current application. Otherwise, the method 800 proceeds to step 812 where the predictive engine 206 determines whether the period of frequent application usage is going to occur in the near future. A threshold value for what is considered the "near future" can be predetermined by the mobile device 102 or manually set by a user. If the period of frequent application usage is going to occur in the near future then a utility of less than 1 is assigned to the current application by the predictive engine 206. In some embodiments, a utility value can be proportional to the difference between the present time and the time of frequent application usage or other circumstance. If the difference is outside of, or more than, a predetermined threshold then the utility for the current application can be assigned to 0. Thereafter, the method 800 is referred to node D and can return to method 500.

Figure 9A:
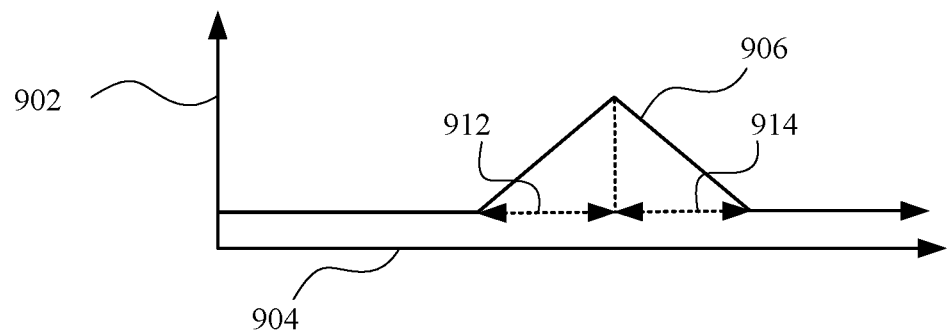
FIGS. 9A-9C illustrate different plots that represent changes in values of utility for an application over time depending on the type of utility valuation being performed, according to some embodiments described herein.
Figure 9B:
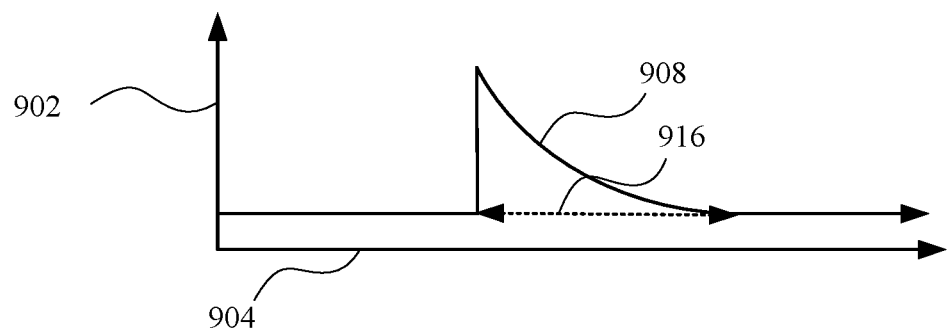
Figure 9C:
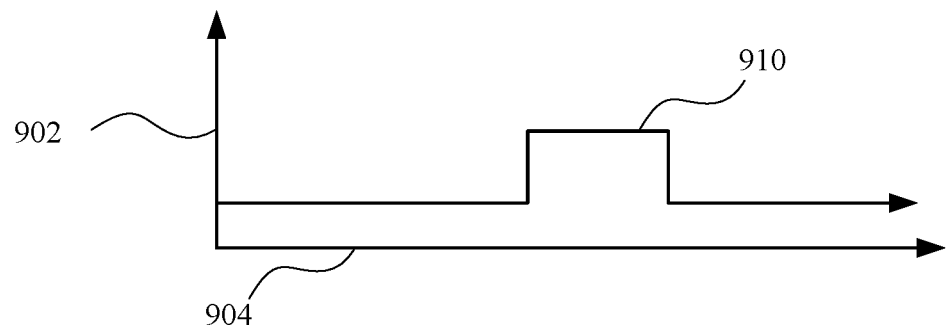

FIGS. 9A-9C illustrate different plots that represent changes in utility for an application over time depending on the type of utility assignment being performed, according to some embodiments described herein. Specifically, FIG. 9A illustrates a utility plot 906 having multiple slopes or portions where the utility 902 changes over time 904. The utility of a particular application can be 0 or some other constant until a particular circumstance approaches, as further described herein. Upon the difference between the current time and the time of the circumstance being within a first predetermined threshold 912, the utility can begin to increase as shown in FIG. 9A. The utility of the application can peak, or be assigned 1, at a point when the circumstance is occurring. When the time of the circumstance passes, the utility of the application can gradually decrease, as illustrated in FIG. 9A. Once a difference between the current time and the time of the circumstance is beyond a second predetermined threshold 914, the utility can return to 0 or some other constant value.

FIG. 9B illustrates a utility plot 908 for an application where the utility plot 908 includes a peak value and a single slope. The single slope can be provided before the peak or after the peak (as shown) in some embodiments. According to FIG. 9B, the utility of a particular application can be 0 or some other constant prior to the occurrence of a particular circumstance. At the time of the particular circumstance, the utility of the application can peak to a value of 1 or some other constant representing a highest utility or other utility value. After the time of the particular circumstance, the utility plot 908 can gradually decline thereby giving the application a utility value that decreases over time. The gradual decline can be linear, exponential, or any other suitable curve for tapering the value of utility. When a difference between the current time and the time of the circumstance is beyond a predetermined threshold 916, the utility can return to 0 or some other constant value.

FIG. 9C illustrates a utility plot 910 for an application where the utility plot 910 includes a constant value over a period of time. The constant value can be a peak value of 1 or any other constant value that either indicates the highest utility or any other utility value for a particular application. According to FIG. 9C, the utility of a particular application can be 0 or some other constant prior to the occurrence of a particular circumstance. At the time of the particular circumstance, the utility of the application can peak or otherwise be set to a constant value for a period time (e.g., 1). The period of time can be a period of frequent application usage for a particular application, a period of a particular event related to an application, or any other suitable period of time that an application can be of interest to a user. Upon the period of time or the particular circumstance coming to an end, the utility can return to 0 or some other constant value that indicates less utility than the highest utility.

Figure 10:
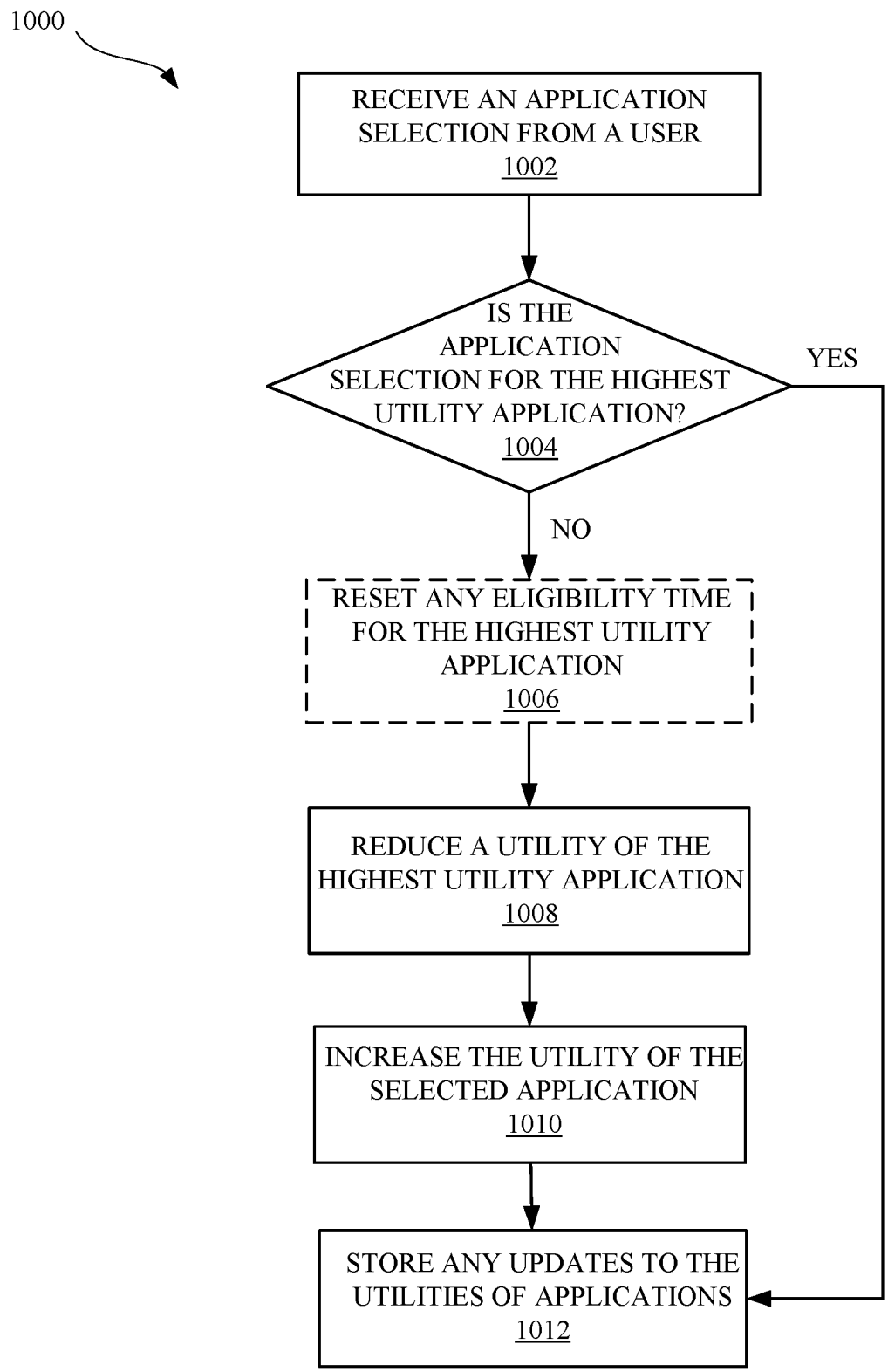
FIG. 10 illustrates a method for resetting the utility of an application, according to some embodiments described herein.

FIG. 10 illustrates a method 1000 for resetting the utility of an application according to some embodiments described herein. Specifically, FIG. 10 provides a method 1000 for adapting the utilities of applications according to the user's selection of applications at a time when applications are suggested to a user. At step 1002, the predictive engine 206 receives an application selection from a user. The method 1000 proceeds to a step 1004 where the predictive engine 206 determines whether the application selection was for the highest utility application. If the application selection was for the highest utility application then the predictive engine 206 does not modify the utility of the selected application and proceeds to a step 1012 where the predictive engine 206 stores any updates to the utilities of applications. If the application selection from step 1002 is determined by the predictive engine 206 at step 1004 to not be for the highest utility application then the method 1000 can proceed to an optional step 1006. At optional step 1006, the predictive engine 206 resets an eligibility timer for the highest utility application. The optional step 1006 the predictive engine 206 can ensure that an application, which was previously assigned as the highest utility application, is not assigned as the highest utility application again until the eligibility timer reaches a predetermined value. For example, if the predetermined value for the eligibility timer is for 15 minutes and the user does not select the highest utility application when the highest utility application is suggested to the user, the eligibility timer can be reset according to method 1000 and the former highest utility application will not be eligible to be the highest utility application again for a 15 minute period. The predetermined value for the eligibility timer can be set by the user or automatically by the mobile device 102 for any suitable timer value. The method 1000 can proceed to a step 1008 where the predictive engine 206 reduces the utility of the highest utility application. In this way, the utility of a previously highest utility application can either be given a utility of 0, swap utilities with another application from a list of applications, or be given any other suitable utility value that does not indicate a highest utility value. For example, a multiplier or percentage (e.g., 95%) can be used to decrease a utility of a previously highest utility application that was not selected by a user. Therefore, in the case that a highest utility is indicated by a 1, the utility would be reduced to 0.95 after being reduced by the multiplier.

The method 1000 can further include a step 1010 where the predictive engine 206 increases a utility of the selected application. The selected application can be increased to any suitable value or the maximum utility value (e.g., 1). The selected application can also be increased by a multiplier or percentage in some embodiments. For example, if the multiplier or percentage is 105%, an application that was previously provided a utility of 0.95 can be given a utility of 1 (i.e., 1 rounded from 0.9975). In this way, the utility of an application can be adapted to the selections of a user over time. The method 1000 can then proceed step 1012 where the predictive engine 206 stores any updates to the utilities of applications (e.g., the utility for the selected application and the application that was previously the highest utility application). For example, a user may have had a habit of checking a mail application in the morning, potentially making that mail application the highest utility application in the morning. If the user begins to use a newer mail application in place of the previous mail application, the utility of the newer application can exceed the utility of the previous mail application over time according to the embodiments described herein. This change in utilities for the respective mail applications saves the user time each morning when the user decides on a particular mail application to use.

Figure 11:
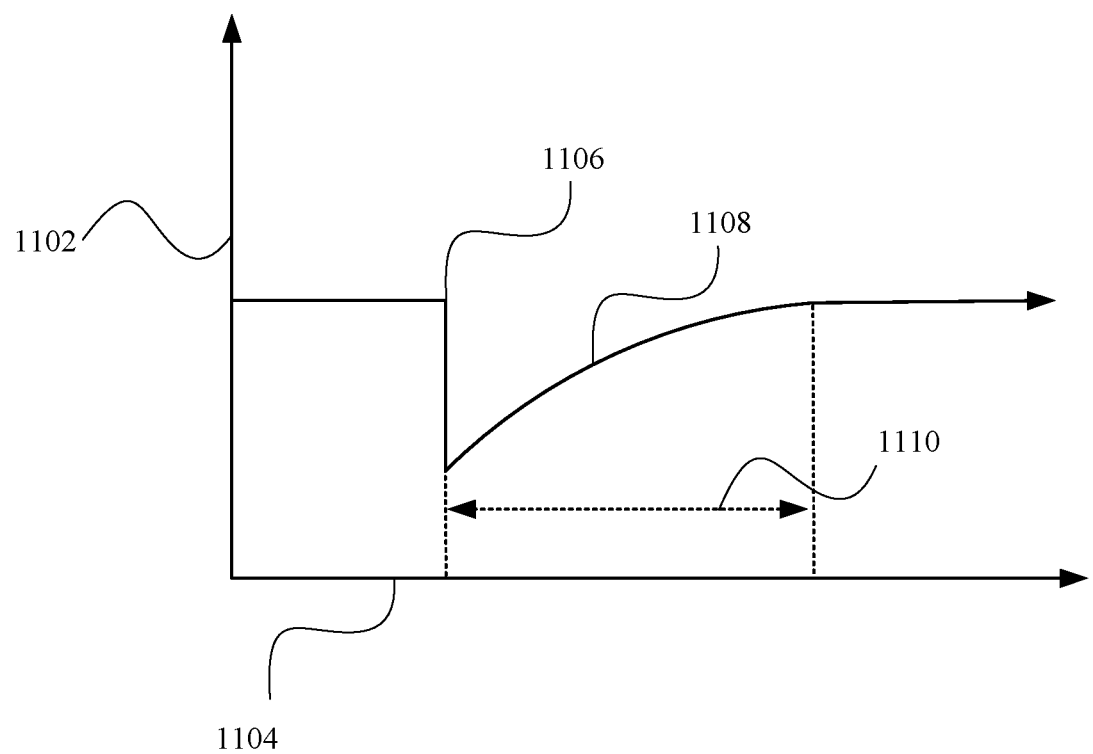
FIG. 11 illustrates resetting of an eligibility timer, according to some embodiments described herein.

FIG. 11 illustrates a resetting of an eligibility timer according to some embodiments described herein. The eligibility timer can be used to prevent an application from being considered a highest utility application for a predetermined period of time. Additionally, the eligibility timer can be controlled by any of the engines, services, applications, or related systems described herein. The axis 1102 of FIG. 11 can represent a weight value 1108 and the axis 1104 can represent time. When a circumstance 1106 occurs, the weight value 1108 can be reset to either a 0 value or any another value that will prevent the application from being considered the highest utility application for a predetermined threshold time 1110. For example, when a weight value 1108 is part of the eligibility timer, the weight value 1108 will be multiplied by a utility value for a particular application. When the weight value 1108 is reset to 0 or another value that acts as a reducing multiplier, the utility of the application will be decreased and the application will not be eligible for the highest utility at least until a threshold time 1110 has passed and the weight value 1108 returns to 1 or any other suitable value.

Figure 12:
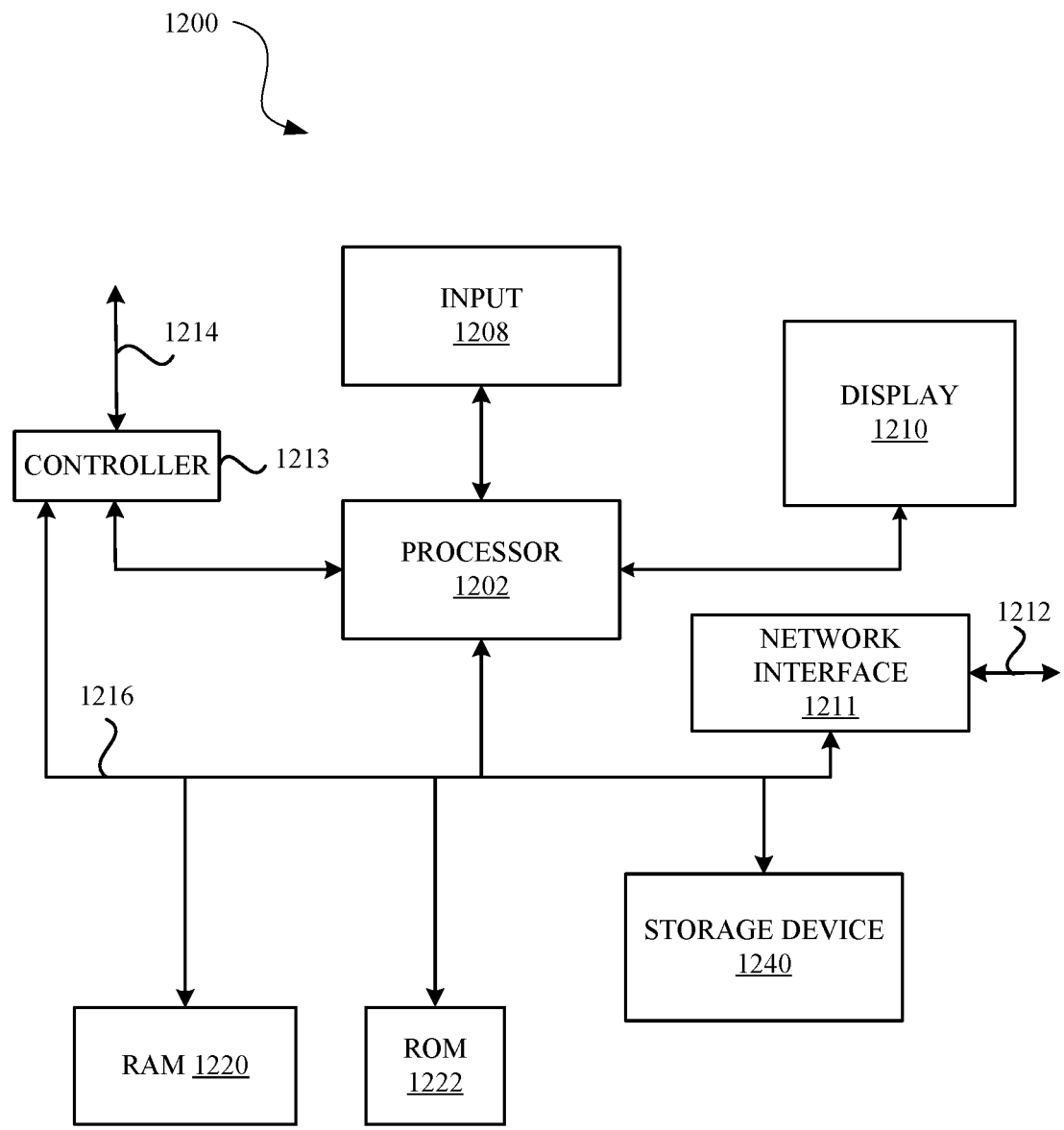
FIG. 12 illustrates a detailed view of a computing device that can be used to implement the various components described herein, according to some embodiments.

FIG. 12 illustrates a detailed view of a computing device 1200 that can be used to implement the various components described herein, according to some embodiments. In particular, the detailed view illustrates various components that can be included in the mobile device 102 or provisioning server 140 illustrated in FIGS. 1A-1B. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user. A data bus 1216 can facilitate data transfer between at least a storage device 1240, the processor 1202, and a controller 1213. The controller 1213 can be used to interface with and control different equipment through and equipment control bus 1214. The computing device 1200 can also include a network/bus interface 1211 that couples to a data link 1212. In the case of a wireless connection, the network/bus interface 1211 can include a wireless transceiver. For example, for mobile device 102, the network/bus interface 1211 can include radio transceiver to connect with a plurality of communication networks associated with a plurality of mobile network operators.

The computing device 1200 also include a storage device 1240, which can comprise a single disk or a plurality of disks (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory (RAM) 1220 and a Read-Only Memory (ROM) 1222. The ROM 1222 can store programs, utilities or processes to be executed in a non-volatile manner. The RAM 1220 can provide volatile data storage, and stores instructions related to the operation of the mobile device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing applications, the method comprising, at an electronic device:
receiving a request to display a list of applications, wherein the request includes at least one circumstance property;
identifying a plurality of applications based on the at least one circumstance property, wherein each application of the plurality of applications is associated with a respective utility value;
displaying, within the list of applications, at least two applications of the plurality of applications, wherein the at least two applications are ordered within the list of applications based on their respective utility values;
receiving a selection of an application from the list of applications;
in response to determining that the application is not a highest-recommended application within the list of applications:
assigning a first weight to the application that artificially increases its respective utility value; and
activating the application.

2. The method of claim 1, wherein the at least one circumstance property is associated with at least one of a geographical location, a time of day, a calendar event, a usage of the electronic device, a presence of one or more devices external to the electronic device, or outgoing or incoming signals received or output, respectively, by the electronic device.

3. The method of claim 1, wherein the first weight is applied when a second request is received to display a second list of applications.

4. The method of claim 1, wherein the request is received in conjunction with a finger being dragged across a display with which the electronic device is communicably coupled.

5. The method of claim 1, wherein each application included in the list of applications is represented with a respective icon.

6. The method of claim 1, wherein the respective utility values of the plurality of applications span a range that is based on a number of applications included in the plurality of applications.

7. The method of claim 1, further comprising:
assigning, to the highest-recommended application, an eligibility timer that causes the respective utility value of the highest-recommended application to be artificially lower until the eligibility timer lapses.

8. The method of claim 1, wherein:
the respective utility values of the plurality of applications are ordered in a descending order when a higher utility value indicates higher priority, and
the respective utility values of the plurality of applications are ordered in an ascending order when a lower utility value indicates higher priority.

9. At least one non-transitory computer-readable storage medium storing instructions that, in response to being executed by at least one processor included in an electronic device, cause the electronic device to carry out steps that include:
receiving a request to display a list of applications, wherein the request includes at least one circumstance property;

identifying a plurality of applications based on the at least one circumstance property, wherein each application of the plurality of applications is associated with a respective utility value;

displaying, within the list of applications, at least two applications of the plurality of applications, wherein the at least two applications are ordered within the list of applications based on their respective utility values;

receiving a selection of an application from the list of applications;

in response to determining that the application is not a highest-recommended application within the list of applications; and activating the application.

10. The at least one non-transitory computer-readable storage medium of claim 9, wherein the at least one circumstance property is associated with at least one of a geographical location, a time of day, a calendar event, a usage of the electronic device, a presence of one or more devices external to the electronic device, or outgoing or incoming signals received or output, respectively, by the electronic device.

11. The at least one non-transitory computer-readable storage medium of claim 9, wherein the first weight is applied when a second request is received to display a second list of applications.

12. The at least one non-transitory computer-readable storage medium of claim 9, wherein the request is received in conjunction with a finger being dragged across a display with which the electronic device is communicably coupled.

13. The at least one non-transitory computer-readable storage medium of claim 9, wherein each application included in the list of applications is represented with a respective icon.

14. The at least one non-transitory computer-readable storage medium of claim 9, wherein the respective utility values of the plurality of applications span a range that is based on a number of applications included in the plurality of applications.

15. The at least one non-transitory computer-readable storage medium of claim 9, wherein the steps further include:

assigning, to the highest-recommended application, an eligibility timer that causes the respective utility value of the highest-recommended application to be artificially lower until the eligibility timer lapses.

16. An electronic device, comprising:
at least one processor; and
at least one memory storing instructions that, in response to being executed by the at least one processor, cause the electronic device to carry out steps that include:

receiving a request to display a list of applications, wherein the request includes at least one circumstance property;

identifying a plurality of applications based on the at least one circumstance property, wherein each application of the plurality of applications is associated with a respective utility value;

displaying, within the list of applications, at least two applications of the plurality of applications, wherein the at least two applications are ordered within the list of applications based on their respective utility values;

receiving a selection of an application from the list of applications;

in response to determining that the application is not a highest-recommended application within the list of applications;

assigning a first weight to the application that artificially increases its respective utility value; and activating the application.

17. The electronic device of claim 16, wherein the at least one circumstance property is associated with at least one of a geographical location, a time of day, a calendar event, a usage of the electronic device, a presence of one or more devices external to the electronic device, or outgoing or incoming signals received or output, respectively, by the electronic device.

18. The electronic device of claim 16, wherein the first weight is applied when a second request is received to display a second list of applications.

19. The electronic device of claim 16, wherein the request is received in conjunction with a finger being dragged across a display with which the electronic device is communicably coupled.

20. The electronic device of claim 16, wherein each application included in the list of applications is represented with a respective icon.

* * * * *

UNITED STATES PATENT AND TRADEMARK OFFICE
CERTIFICATE OF CORRECTION

PATENT NO. : 11,048,681 B2
APPLICATION NO. : 15/374946
DATED : June 29, 2021
INVENTOR(S) : Stephen C. Peters et al.

It is certified that error appears in the above-identified patent and that said Letters Patent is hereby corrected as shown below:

In the Claims

In Claim 9, at Column 15, Line 14-15: "applications; and activating the application." should read
-- applications: assigning a first weight to the application that artificially increases its respective utility value; and activating the application. --.

Signed and Sealed this
Eighth Day of November, 2022

Katherine Kelly Vidal
*Director of the United States Patent and Trademark Office*